US008583799B2

(12) United States Patent
Podila

(10) Patent No.: US 8,583,799 B2
(45) Date of Patent: Nov. 12, 2013

(54) DYNAMIC COST MODEL BASED RESOURCE SCHEDULING IN DISTRIBUTED COMPUTE FARMS

(75) Inventor: Sharma R. Podila, Santa Clara, CA (US)

(73) Assignee: Oracle International Corporation, Redwood City, CA (US)

( * ) Notice: Subject to any disclaimer, the term of this patent is extended or adjusted under 35 U.S.C. 154(b) by 210 days.

(21) Appl. No.: 13/103,748

(22) Filed: May 9, 2011

(65) Prior Publication Data

US 2012/0290725 A1    Nov. 15, 2012

(51) Int. Cl.
 *G06F 15/173* (2006.01)
(52) U.S. Cl.
 USPC .......................... 709/226; 709/224; 709/225
(58) Field of Classification Search
 USPC .......................................................... 709/226
 See application file for complete search history.

(56) References Cited

U.S. PATENT DOCUMENTS

| | | | |
|---|---|---|---|
| 6,910,024 B2 | 6/2005 | Krishnamurthy et al. | |
| 6,968,323 B1 | 11/2005 | Bansal et al. | |
| 7,739,153 B1 | 6/2010 | Anderson et al. | |
| 7,743,001 B1 | 6/2010 | Vermeulen et al. | |
| 8,082,550 B2* | 12/2011 | O'Toole, Jr. | 718/104 |
| 2003/0154282 A1* | 8/2003 | Horvitz | 709/226 |
| 2004/0010592 A1* | 1/2004 | Carver et al. | 709/226 |
| 2005/0021446 A1* | 1/2005 | Whinston et al. | 705/37 |
| 2005/0234935 A1 | 10/2005 | Barsness et al. | |
| 2006/0190605 A1* | 8/2006 | Franz et al. | 709/226 |
| 2008/0141048 A1* | 6/2008 | Palmer et al. | 713/300 |
| 2008/0154798 A1 | 6/2008 | Valz | |
| 2008/0250143 A1* | 10/2008 | Garg et al. | 709/226 |
| 2009/0300608 A1 | 12/2009 | Ferris et al. | |
| 2010/0005173 A1* | 1/2010 | Baskaran et al. | 709/226 |
| 2010/0076856 A1* | 3/2010 | Mullins | 705/26 |
| 2010/0088126 A1* | 4/2010 | Iaia et al. | 705/5 |
| 2010/0088205 A1* | 4/2010 | Robertson | 705/34 |
| 2010/0131624 A1 | 5/2010 | Ferris | |
| 2010/0217865 A1 | 8/2010 | Ferris | |
| 2010/0235355 A1 | 9/2010 | Carter et al. | |

(Continued)

OTHER PUBLICATIONS

Vanmechelen, Kurt, et al., "A Comparative Analysis of Single-Unit Vickrey Auctions and Commodity Markets for Realizing Grid Economies with Dynamic Pricing," GECON 2007, LNCS 4685, pp. 98-111, 2007.

(Continued)

*Primary Examiner* — Brian J Gillis
*Assistant Examiner* — Michael A Keller
(74) *Attorney, Agent, or Firm* — Kent A. Lembke; Jonathon A. Szumny; Marsh Fischmann & Breyfogle, LLP

(57) ABSTRACT

Systems, methods and apparatuses (i.e., utilities) for use in performing dynamic cost model (DCM)-based scheduling of resources of a distributed computing system (e.g., server farms, computing clouds, and the like). In one arrangement, cost for consumption of a resource or type of resource of the system may be dynamically determined as a function of both a demand for and an availability of the resource. In this regard, changing demand for and/or availability of the resource over time can also adjust a cost for consumption of the resource. For instance, assigning a lower consumption cost to utilizing of a resource in low demand can benefit system operators by realizing increased use on little-used resources as well as users by allowing the users to take advantage of lower usage costs.

18 Claims, 5 Drawing Sheets

(56) References Cited

U.S. PATENT DOCUMENTS

| | | |
|---|---|---|
| 2010/0319004 A1 | 12/2010 | Hudson et al. |
| 2011/0154353 A1* | 6/2011 | Theroux et al. ............... 718/104 |
| 2011/0213888 A1* | 9/2011 | Goldman et al. ............. 709/228 |
| 2011/0225300 A1* | 9/2011 | Kaneki ......................... 709/226 |
| 2012/0030356 A1* | 2/2012 | Fletcher ........................ 709/226 |
| 2012/0260256 A1* | 10/2012 | De Faria et al. .............. 718/103 |

OTHER PUBLICATIONS

Abdelkader, K., et al., "Pricing Computational Resources in Dynamic Grid," appears in Complex, Intelligent and Software Intensive Systems, 2008. CISIS 2008. International Conference on Mar. 4-7, 2008, pp. 303-308, Barcelona, 978-0-7695-3109-0.

* cited by examiner

| SYSTEM RESOURCES 216 | | 220 | 224 | 228 | 232 | 236 |
|---|---|---|---|---|---|---|
| CATEGORY | TYPE | LOCATION(S) | COST STRUCTURE | QUANTITY | DEMAND | AVAILABILITY |
| PROCESSING | 3.5 GHZ<br>2.5 GHZ | NODES 1,2<br>NODES 3,4 | 0.10 ($/HR)<br>0.05 ($/HR) | 2,000<br>4,000 | 1,500<br>1,000 | 500<br>3,000 |
| MEMORY | 8 GB<br>4 GB | NODES 1,4<br>NODES 5 | 0.30 ($/HR)<br>0.20 ($/HR) | 3,000<br>5,000 | 2,000<br>2,000 | 1,000<br>3,000 |
| STORAGE | 2 TB<br>1.5 TB | NODES 1-5<br>NODES 1-5 | 60.00 ($/MONTH)<br>50.00 ($/MONTH) | 2,000<br>3,000 | 1,000<br>500 | 1,000<br>2,500 |

FIG.2

| SYSTEM RESOURCES | | | | |
|---|---|---|---|---|
| COST STRUCTURE NAME | CATEGORY | TYPE | LOCATION | COST STRUCTURE |
| C1 | PROCESSING | 3.5 GHz<br>2.5 GHz | NODE 1<br>NODE 3 | 1000.00 ($/YR) + 0.20 ($/HR)<br>0.08 ($/HR) |
| C2 | PROCESSING | 3.5 GHz<br>2.5 GHz | NODE 2<br>NODE 4 | 500.00 ($/YR) + 0.30 ($/HR)<br>300.00 ($/HR) + 0.04 ($/HR) |

FIG. 3

DYNAMIC COST MODEL BASED RESOURCE SCHEDULING IN DISTRIBUTED COMPUTE FARMS

BACKGROUND

1. Field of the Invention

The present invention generally relates to distributed computing systems, and more particularly to systems and methods that utilize dynamic cost models to schedule usage of computing resources within such systems.

2. Relevant Background

Distributed or grid computing generally refers to the use of a collection of distributed, heterogeneous computing resources that may be spread across shared networks and/or geographic areas to satisfy what may be very large computing tasks or demands. For instance, a "compute" or "server" farm may include a plurality of complete computers or servers (e.g., each with onboard CPUs, memory, storage, power supplies, network interfaces, and the like) that are connected to one or more networks (e.g., LAN, WAN, Internet) by any appropriate conventional network interface(s). In a distributed or grid computing environment, the various disparate computers and systems in an organization or among organizations can be organized and managed as a grid to become one large, integrated computing system. The single integrated system can then handle problems and processes too large and intensive for any single computer of the organization(s) to easily handle in an efficient manner. The resources of one or more of such farms may be appropriately leveraged by jobs or "workload items" of one or more organizations or entities over one or more networks. Such jobs and workload items may take many forms such as particular applications that need to be executed, tasks that need to be performed (e.g., providing help desk support for a period of one year), and the like. If managed properly, grid computing can result in reduced cost of ownership, aggregated and improved efficiency of computing, data, and storage resources, and enablement of virtual organizations for applications and data sharing.

Computing over such farms has garnered interest from various industries over time and has undergone some transformations due to shifting focus from simple compute farms to larger scale grids and most recently to very large scale setups often referred to as compute clouds. Massive amounts of workloads may be submitted into such a compute farm, or cloud, with associated service level agreements (SLAs) and other policies and constraints. Products are available from various vendors as well as from open source projects to address such SLAs, policies, constraints, and/or the like. A recent incarnation in the form of compute clouds (i.e., cloud computing) focuses mainly on hosting services that deliver compute capacity for interested users in a more elastic fashion whereby an amount of resources provisioned for a given user or group scales up and down based on demand. In this regard, the user pays for resources actually consumed in a manner similar to paying for utilities such as domestic electric power, natural gas, and the like.

A core part of a system that provides compute farm/grid/cloud services is the distributed resource scheduler. The scheduler typically evaluates all available resources (e.g., processing capacity, available memory, and the like) against the requested resource usages of incoming workload items (as well as existing SLAs, policies, constraints, and the like) as part of building a schedule of workload execution (i.e., which workload items have priority to resources of the grid or farm relative to other workload items). When demand exceeds available resources, some workload items may have to wait for later execution. Other criteria may also make some workloads wait for later execution such as SLAs that specify calendar time or other constraints which can only be met at a later time.

Some farms choose to allocate costs for consuming farm resources to users according to a specific monetary amount per unit time in relation to a particular type of resource (e.g., a user may be charged $0.10 per hour of CPU, network, storage, or other services or resources consumed). Other farms may choose not to charge actual currency but incorporate other ways of sharing resources such as a "fair share" mechanism whereby various organizations or departments using the shared farm are given a percentage of the total computing "pie".

SUMMARY

Existing techniques for scheduling resources in compute farms and clouds generally deal with such resource consumption costs in a static manner. For example, the consumption cost for a requested type of resource (e.g., use of up to 2000 CPUs at any time) by a workload item is the same whether or not there is demand for the type of resource being requested. Furthermore, consumption cost is often the same irrespective of the quality of the resource. For instance, the consumption cost for the use of 2000 3 GHz CPUs would be the same as the use of 2000 2.2 GHz CPUs. Sometimes, the demand for and quality of a type of resource go hand in hand (e.g., lower quality resources are often those in lower demand and vice versa).

Furthermore, previous and current techniques for scheduling resources in compute farms limit opportunities for farm and cloud operators as well as associated users by largely ignoring the dynamic nature of resource demands from workloads in addition to the changing nature of resource availability throughout the farm. For instance, getting any usage on resources that are in lower demand (e.g., because the resources are of lower quality, are too expensive, are not suitable for all workloads, and the like) may be considered a bonus for a farm or cloud operator. In relation to users, their total resource usage costs may be unnecessarily high when a workload item that is utilizing a lower quality resource must run for a longer period of time, especially when the cost per unit time of using such lower quality resource is close to the cost per unit time of a higher quality resource. For instance, a department with a fixed budget per month would be able to run fewer workload items as compared to utilizing the same fixed budget on higher quality machines or resources. In such situations, users often avoid using such resources and wait for higher quality resources to free up later.

Accordingly, disclosed herein are methods, computer readable mediums (e.g., non-transitory), apparatuses and systems (i.e., utilities, collectively) for use in performing dynamic cost model (DCM)-based scheduling of what may be disparate resources within computing grids, server farms, compute clouds, and the like. DCM-based scheduling utilizes a function of the demand for and availability of the particular resource or type of resource in determining a cost to allocate to a consumption or requested consumption of the particular resource or resources in a distributed computing system (e.g., compute farm, compute cloud, and/or the like) by jobs or workload items of users. Resource specific costs (e.g., cost structures) may also be taken into account when assigning consumption costs of the various resources of the distributed computing system. For instance, a resource with higher demand would result in a higher consumption cost as would a resource with a higher resource specific cost (e.g., a resource having a higher "cost structure" than another resource).

The dynamically determined usage and/or consumption costs may be utilized as part of resource allocation scheduling to the benefit of both distributed computing system providers as well as users of distributed computing system resources. As one example, imagine a compute farm or cloud that has a particular type of resource that is not in high demand among incoming workload items (e.g., because the resource is of low quality and/or not suitable for most workloads). Users may avoid this type of resource because of the lower quality, the similar cost compared to higher quality resources, and/or the like. Cloud and farm operators may thus miss out on potential revenue due to the low usage of this type of resource. Accordingly, the utilities disclosed herein may take into account the lower demand (and/or higher availability) of the above-mentioned type of resource to dynamically adjust a consumption cost for using this type of resource to, for instance, a level lower than a consumption cost of resource that is in higher demand and/or of higher quality. As a result, system operators may benefit by realizing increased usage (and thus increased revenue) on resources in lower demand while cost sensitive or non-time sensitive users may be able to take advantage of the lower costs associated with the utilization of slower or more out of date resources of the distributed computing system.

The utilities disclosed herein can also facilitate the carrying out of fair share-tree based resource allocation models as they relate to distributed computing systems. In a fair share-tree based resource allocation model, each of a number of users or groups is given a "share entitlement" of the total computing "pie" (e.g., in percentage terms) of the distributed computing system. As an example, consider a 10,000 CPU cloud where all compute servers accept workload from multiple user groups, and assume that a "group A" that has 20% share entitlement of the 10,000 CPU pool (which guarantees that group A has a minimum of 2,000 CPUs running its workload). In this example, assume the 10,000 CPUs are made up of 6,500 UltraSPARC T2 CPUs (CMT) that are in low demand, and the remaining 3,500 CPUs are made up of other UltraSPARC processors such as UltraSPARC IV and VII. Also assume that group A has workload types W1, W2, and W3. While only jobs from workload type W1 are ready to run on the CMT CPUs, jobs from each of workload types W1, W2 and W3 are ready to run on rest of the pool.

Imagine that very soon, jobs from workload type W1 in group A will occupy more than 2,000 CPU slots due to both abundance of CMT CPUs and lack of demand from any other project. As a result, the 20% share guarantee associated with group A becomes filled up and jobs from workload types W2 and W3 of group A will not be able to run (because doing so would push group A over its 20% share entitlement), despite the fact that jobs from workload type W1 are running on CPUs of low demand, quality and/or popularity. In this regard, the utilities disclosed herein take into account the low demand and high availability of the CMT CPUs in determining a "cost" to allocate to the consumption of the CMT CPUs by jobs from workload type W1 of group A. For instance, consumption of a single CMT CPU slot may be afforded a lower cost than that for a single UltraSPARC IV or VII CPU (e.g., 0.5 units versus 1.0 unit). Thus, the use of 2,000 CMT CPU slots by jobs from workload type W1 of group A may only count as use of 10% of the CPU cloud as opposed to the entire 20% share entitlement of group A. Accordingly, the cloud or farm operator may take into account the lower "cost" of consuming CMT CPUs and schedule at least some jobs from workload types W2 and W3 to run on UltraSPARC IV or VII CPUs (e.g., as a benefit for group A allowing jobs from workload type W1 to run on the less popular CMT CPUs).

The DCM-based scheduling techniques of the utilities disclosed herein can provide benefits to distributed computing system providers by improving their ability to guarantee SLAs (e.g., guaranteeing share entitlements), improving utilization of resources, increasing revenues, and the like. As one example, the DCM techniques disclosed herein can be performed on all of a particular category of resource (e.g., on all CPUs of the compute or server farm), and then incoming workload items can be scheduled on those particular CPUs (e.g., 2.5 GHz, 3.5 GHz, and/or the like) currently associated with the lowest consumption costs. Providers and operators can use DCM-based scheduling to ensure that those workloads that are of greater importance (e.g., in terms of revenue generation or criticality) are scheduled on the right resources. For instance, if a user is willing to "pay" (e.g., in currency, share entitlement usage, and/or the like) for consumption of a system resource having a consumption cost that has been dynamically determined (i.e., taking into account demand for and availability of the resource) to be higher than that of another resource, then the system operator can take extra measures to see that the user's workload items are scheduled on exactly or substantially exactly the requested resources rather than just similar resources (due to the increased cost to be paid by the user for use of the resources). Accordingly, cloud and farm operators and users may be able to better leverage use of disparate types of resources of such clouds and farms and at least partially avoid the aforementioned inefficiencies associated with determining consumption costs in a strictly static manner.

In one aspect, a method includes receiving, at a resource scheduling module of a distributed processing or computing system, at least one request to consume a first resource (e.g., CPUs or processing modules) of the distributed processing system by at least a first workload item of a first project, where a plurality of the first resource are distributed throughout the distributed processing system. In one arrangement, one or more of a plurality of nodes of the distributed processing system may include at least some of the first resource (e.g., each node may include a pool of one or more types of CPUs, such as 2.5 GHz CPUs, 3.5 GHz CPUs, and/or the like). In any event, the method of this aspect also includes, for each of the plurality of the first resource, obtaining a demand for consumption of the resource by workload items, obtaining an availability for consumption of the resource by workload items, and establishing a cost for consuming the resource by obtaining, using a processor, a product of a) a cost structure of the resource and b) a quotient of the demand for and availability of the first type of resource. Furthermore, the first workload item is incorporated into a schedule that allocates use of the plurality of the first resource among workload items based at least partially on the consumption costs, and use of each of the plurality of the first resource is allocated among the workload items.

For instance, at some time after the demand for and availability of each of the first resource have been obtained, at least one of an updated demand and an updated availability in relation to at least one of the plurality of the first resource may be obtained from the distributed processing system, and then an updated cost for consuming the at least one of the plurality of the first resource may be established by obtaining, using the processor, a product of a) its cost structure and b) a quotient of the updated demand for and/or updated availability. In this regard, the cost to allocate to a particular workload item or project for consumption of a particular resource or resources for use in determining scheduling of such resources may dynamically change as the demand for and availability of the first type of resource change. As discussed above, cloud and farm operators and users may be able to take advantage of such changing parameters depending upon their respective circumstances.

In another aspect, a non-transitory computer readable medium that stores instructions executable by one or more processors to perform a method is disclosed. The method includes receiving, at a resource scheduling module of at least a first computing grid, requests to consume a first type of resource of the first computing grid by a plurality of workload items of a first user group and by a plurality of workload items of a second user group of the plurality of user groups; and obtaining, at the resource scheduling module, share entitlements of the first type of resource describing a quantity of use of the first type of resource by the first and second user groups, respectively. For instance, the share entitlements may be percentages of a total capacity of the first type of resource (e.g., the first user group share entitlement of the first type of resource is 20% and that of the second user group is 40%). In one arrangement, the share entitlement of a particular user group may represent a relative quantity or amount of the resource that is to be available to the user group at any one time.

In any event, the method also includes dynamically determining costs for consumption of the first type of resource by each of the workload items of the first and second user groups, summing the consumption costs of the workload items of the first user group and the consumption costs of the workload items of the second user group to respectively obtain usage costs for the first and second user groups, and utilizing the usage costs and share entitlements of the first type of resource of the first and second user groups in determining allocation of use of the first type of resource between the first and second user groups.

As an example, the utilizing may include obtaining a first quotient of the usage cost and share entitlement of the first user group, obtaining a second quotient of the usage cost and share entitlement of the second user group, determining a lower of the first and second quotient, and allocating use of the first type of resource to the one of the first or second user group associated with the lower of the first and second quotient before allocating use to the other of the first or second user group. Accordingly, users with greater share entitlements or lower usage costs may be conferred higher priority for workload items than vice versa.

Another aspect is a computing system for use in scheduling usage of a plurality of resources of a computing cloud by a plurality of workload items. The computing system includes a processing module and a memory module logically connected to the processing module with a set of computer readable instructions executable by the processing module to receive a request to consume a first type of resource the computing cloud by at least a first workload item of a first project, obtain from the computing cloud a demand for consumption of the first type of resource by workload items, obtain from the computing cloud an availability for consumption of the first type of resource by workload items, utilize a quotient of the demand for and availability of the first type of resource to establish a cost for consuming the first type of resource by the first workload item, and incorporate the first workload item into a schedule that allocates use of the first type of resource among workload items based at least partially on the consumption cost.

In addition to the exemplary aspects and embodiments described above, further aspects and embodiments will become apparent by reference to the drawings and by study of the following descriptions.

BRIEF DESCRIPTION OF THE DRAWINGS

FIG. 2 is one embodiment of a database including information that may be used by the system manager as part of resource scheduling.

FIG. 3 is another embodiment of a database including information that may be used by the system manager as part of resource scheduling.

DETAILED DESCRIPTION

Figure 1:
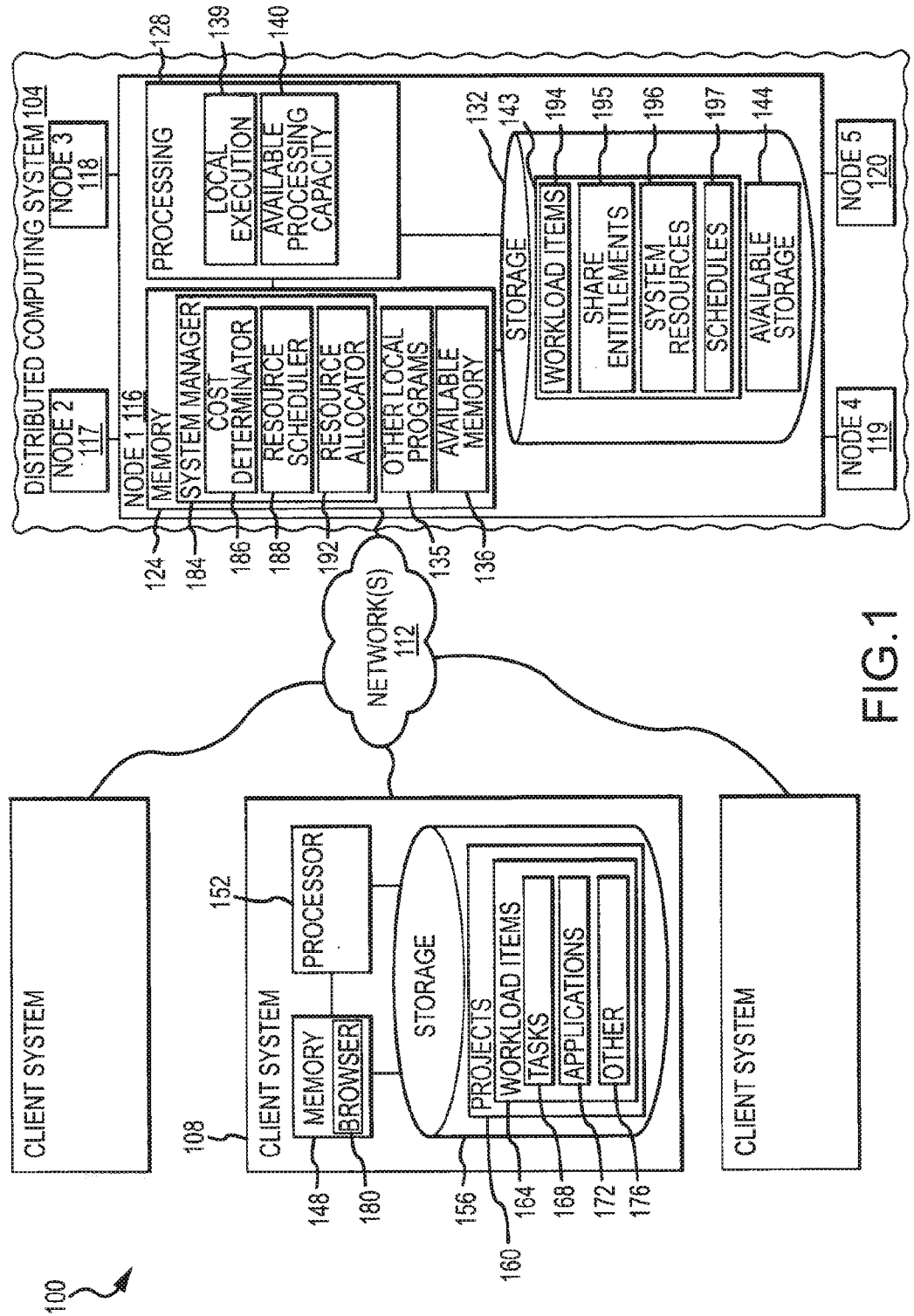
FIG. 1 is a functional block diagram of a distributed processing environment including at least one distributed processing system, where a node of the distributed processing system includes a system manager for scheduling use of resources of the distributed processing system.

The present disclosure is generally directed to the incorporation of dynamic cost models (DCM) into the scheduling of resources (e.g., processing modules, memory modules, storage devices, software, and/or the like) within a distributed computing system (e.g., which may include one or more compute farms, computing grids or clouds, and/or the like). That is, instead of merely depending upon one or more static cost models (e.g., $/hr) to assign costs for resource (e.g., CPU) consumption by a particular job or workload item of an entity or user, the present discussion focuses on alternatively or additionally incorporating both a demand for and an availability of the particular resource (e.g., processors) or type of resource (e.g., 3.5 GHz processors) into the determination of resource consumption costs. Demands for and availabilities of particular resources with a distributed computing system can dynamically change as resources are added or removed from the cloud/farm/grid, resources are allocated or reallocated among users, and/or the like. Such dynamically determined consumption costs can be used as part of scheduling usage of resources in the distributed computing system to the benefit of both operators and users.

DCM-based scheduling can provide benefits to distributed computing system providers by increasing revenues and improving utilization of resources. For instance, system operators may benefit by realizing increased usage (and thus increased revenue) on less popular resources by dynamically downwardly adjusting the consumption cost afforded to a user of such resources as a function of demand for and availability of the resources. Use of DCM-based scheduling can also increase the ability of system operators to guarantee SLAs between the operators and users of the distributed computing system. For example, one provision of a particular SLA may specify that a user group is to have a minimum number of a particular type of CPU of the system available to run against its workloads at any time. Using DCM-based scheduling as disclosed herein can allow the system operator to increase utilization of other types of CPUs (e.g., by assigning lower consumption costs to lower quality and/or lower demand CPUs) and thus increase the likelihood that the operator can ensure the above provision of the SLA. Still further, providers and operators can use DCM-based scheduling to ensure that those workloads that are of greater importance (e.g., in terms of revenue generation or criticality) are scheduled on the right resources.

Users of distributed computing systems that utilize DCM-based scheduling can also realize benefits as such users can pay not only per use of such resources (e.g., flat monthly fee, $/hr, and/or the like), but also based on the particular types of resources used and the dynamic demand for and availability of such resources. For instance, users requesting use of premium processing modules may pay the same as or more than such users would under a strictly static cost model, but may realize a more exact alignment of requested resources and subsequently provided resources. As another example, cost sensitive or non-time sensitive users may be able to take advantage of lower costs associated with the utilization of slower or more out of date resources of the distributed computing system. Still further, users in a share-tree based allocation model can be limited from paying a "penalty" (i.e., a hit on their share entitlement) for allowing their workload items to run or be processed on resources of lower popularity and/or of lower demand.

Dynamically-determined consumption costs for resource usage in a distributed computing system as disclosed herein can also be used to facilitate the arbitration of resources that are in high demand. More specifically, when demand for a type of resource exceeds its capacity, some workload items must wait (i.e., be queued up) for later execution while other workload items utilize the resources. In such situations, consumption costs for each of the workload items can be dynamically determined as disclosed herein, and then such dynamically determined consumption cost can be used as part of any appropriate resource arbitration scheme (e.g., a) first come-first serve, b) priority based on specific job attributes such as amount and type of resource required, job's owner/department/project, c) the amount of time the workload item has already waited for use of the resources, d) fair share allocation, and/or the like).

FIG. 1 is a functional block diagram of a distributed computing environment 100 including one or more client systems 108 that can access the resources of a plurality of nodes 116-120 of a distributed computing system 104 that utilizes DCM-based scheduling over any appropriate network(s) 112 (e.g., LAN, WAN, Internet). While five nodes have been illustrated, the distributed computing system 104 may include more or fewer than five nodes. The distributed computing system 104 may represent any configuration of multiple computers (e.g., autonomous computers) that communicate through a computer network and interact with each other to achieve one or more common goals. For instance, the client system 108 may include one or more projects or problems (e.g., running a distributed database, hosting a forum, climate/weather modeling, etc.) to be at least partially addressed by the resources of the distributed computing system 104. Each project or problem may be made up of a number of jobs or workload items, each of which may be solved or addressed by one or more of the nodes 116-120 of the distributed computing system 104.

In one arrangement, the distributed computing system 104 may represent a server or compute farm or cluster maintained by an enterprise, where each of the nodes 116-120 represents a server with onboard CPUs, memory, storage, power supplies, network interfaces, and the like. For instance, the servers may be mounted on racks in a server room or data center and may be interconnected by any appropriate switching fabric(s), router(s), LAN, and/or the like. In another arrangement, the distributed computing system 104 may represent a grid computing system, where the nodes 116-120 represent heterogeneous and/or geographically dispersed computing devices or systems and may be managed by any appropriate middleware (e.g., general-purpose grid software libraries) and/or the like. In a further arrangement, the distributed computing system 104 may represent a computing cloud in the abstract sense. In this arrangement, each of the nodes 116-120 may represent a collection of computation, software, data access, and storage services, the physical location and configuration of which the users may be unaware. For instance, each of the nodes 116-120 could represent one or more server farms or grids. The distributed computing system 104 may also represent various combinations of the above-described arrangements and/or other types of distributed computing arrangements.

In any event, at least one node (e.g., node 116) of the distributed computing system 104 may generally be responsible for evaluating all available resources (e.g., processing capacity, available memory, and the like) of the node 116 itself as well as the other nodes 117-120 of the system 104 against the requested resource usage levels of incoming workload items (e.g., from client system 108) as well as existing SLAs, policies, constraints, and the like. The node 116 uses such evaluations to build a schedule of workload execution and then appropriately allocate the execution of workload items among the various nodes 116-120. Each of the nodes 116-120 may include a memory arrangement 124, processing arrangement 128, and storage arrangement 132 (such arrangements have not been shown for nodes 117-120 in the interest of clarity), among other components (e.g., I/O devices, network interfaces, and the like), all of which may be appropriately interconnected by one or more busses. These components have been referred to as "arrangements" to connote that each node 116-120 may not necessarily include, for instance, only a single memory card (e.g., RAM), processor core, or data store, but may include any appropriate arrangement of memory cards, CPUs or processor cores, and the like. For instance, processor-processor and processor-memory communication can be implemented in hardware in several manners, such as via shared (either multiported or multiplexed) memory, a crossbar switch, a shared bus, an interconnect network of any number of topologies, and/or the like.

Each of the memory arrangement 124, processing arrangement 128 and storage arrangement of each of the nodes 116-120 may include at least a portion dedicated to local housekeeping tasks and/or other items in relation to the particular node 116-120 such as memory for local programs 135, processing capacity for local execution 139, local storage 143, and the like. Furthermore, each of the memory arrangement 124, processing arrangement 128 and storage arrangement of each of the nodes 116-120 may include at least a portion for dedication to the pool of resources that is offered by the distributed computing system 104 for use by the one or more client systems 108 such as available memory 136, available processing capacity 140 (e.g., 2,000 3.5 GHz CPUs) and available storage 144. In one arrangement, one or more of the nodes 116-120 may include any appropriate software or other computer readable code (which may be stored in storage arrangement 132 for instance) for use by workload items of client device 108 (e.g., such as applications, operating systems, and/or the like). In any case, the available memory 136, available processing capacity 140, available storage 144 and/or software may be thought of as "resources" for utilization by the workload items of client devices 104 for use in completing projects or computing problems. As will be discussed in more detail below, the node 116 (or other node(s)) utilizes DCM-based scheduling to schedule usage of such resources by workload items of client system 108 or other client systems.

Before discussing DCM-based scheduling in more detail, the client system 108 (similar discussion may apply to each of the other non-labeled client systems) may broadly represent one or more devices, arrangements, systems, and the like that include(s) or are associated with at least one computing project or problem (which each include, as discussed above, one or more workload items, jobs, tasks, and the like) that may benefit by being executed by or otherwise using the resources of the distributed computing system 104. The client system 108 may be administered by or associated with one or more "users" such as individuals, entities, organizations, and the like. For instance, the client system 108 may represent a personal computing device (e.g., laptop, desktop, smartphone or other mobile device, and/or the like) of an individual; a collection of computing devices of an organization, each being connected to the other computing devices of the organization over a LAN; and/or the like. The client system 108 may include a memory arrangement 148, processing arrangement 152, storage arrangement 156, and/or other components (e.g., I/O devices, network interfaces, and the like), all of which may be appropriately interconnected by one or more busses. These components have been referred to as "arrangements" to connote that each may not necessarily represent a single component (such as a single memory card, a single processor core, a single hard drive or data store, and/or the like), but may also represent numerous such cards, cores, drives and/or the like which may or may not be contained within a common device.

In any case, the memory and/or storage arrangement 148, 156 of the client system 108 may store or include one or more computing problems or projects 160 that need to be carried out on behalf of the user, organization, division, and/or the like. For instance, projects 160 may include any types of computing assignments or undertakings such as creating and/or updating a particular enterprise relational database, conducting economic forecasting for an organization and/or division thereof, performing back office data processing in support for e-commerce and Web services, and/or the like. Each project 160 may be made up of one or more jobs or workload items 164 that may run and/or be executed in conjunction with the resources of the distributed computing system 104 to carry out the particular project 160. Each workload item 164 may include one or more tasks 168 that need to be completed (e.g., determining/calculating yearly gross revenue for each division of an enterprise), one or more applications 172 that need to be executed (e.g., a proprietary piece of economic forecasting software) and/or one or more other types of items 176 that need to be addressed as part of the completion of the project 160. In some arrangements, workload items 164 may include more fine-grained aspects of tasks and/or applications such as particular portions of software code to be executed and/or the like.

Any appropriate type of interface(s) may be used to facilitate use of the resources of the distributed computing system 104 by the projects 160 and corresponding workload items 164 of the client system 108. In one arrangement, the client system 108 may run any appropriate web browser 180 that may be used to communicate with and access the resources of the distributed computing system 104 over network(s) 112. For instance, node 116 (and/or other node(s) of the distributed computing system 104) may have one or more corresponding programs or modules (e.g., resource scheduling module or system manager 184) for communicating with the web browser using any appropriate application programming interface(s) (API) or protocol(s). In this regard, the browser 180 of client system 108 may pass data (e.g., metadata) related to projects 160 and corresponding workloads items 164 to the system manager 184 which the system manager 184 initially uses to perform DCM-based scheduling of resource utilization of the distributed computing system 104 (i.e., determining which resources of distributed computing system 104 will address one or more particular workload items 164 of one or more projects 160) as will be discussed in greater detail below.

In some arrangements, all workload items 164 (e.g., tasks 168, applications 172, data, and/or the like) may be passed to node 116 via the system manager 184 which may then delegate handling and processing of the workload items 164 among the resources of the nodes 116-120 according to the DCM-determined schedule. In other arrangements, the system manager 184 initially collects metadata related to the projects 160 and/or the workload items 164 (e.g., anticipated processing requirements, anticipated storage space, associated SLAs) from the browser 180 and/or other sources (e.g., storage arrangement 132) to build a DCM-based schedule of resource utilization. After the system manager 184 has communicated the DCM-determined schedule to the browser 180, the browser 180 may pass workload items directly to one or more of the nodes 116-120 (e.g., via appropriate programs/modules/interfaces on the nodes 116-120) for execution and/or processing by resources of such nodes 116-120 according to the DCM-determined schedule. Other manners of transmitting workload items 164 between the client system 108 and the distributed computing 104 are also envisioned.

The client system 108 is not limited to use of web browser 180 to facilitate resource utilization of the distributed computing system 104. In some arrangements, client system 108 may include a local desktop client (not shown) that has access to projects 160 and corresponding workload items 164 and facilitates communication with the distributed computing system 104. Furthermore, it may not always be necessary that the client system 108 traverses the Internet to access the resources of the distributed computing system 104. For instance, and in the situation where the client system 108 and distributed computing system 104 are part of the same organization or entity (e.g., where the distributed computing system 104 is in the form of a dedicated server farm for a particular organization), the client device 108 may merely access the distributed computing system 104 via local networks (LANs and/or the like). Still further, and although not shown, the client system 108 may in some embodiments form part of one of the nodes 116-120 of the distributed computing system. That is, a node of the distributed computing system 104 may both make resources (e.g., memory, processing, and/or the like) available for use by workload items of client systems as well as include workload items that require the use of resources of the distributed computing system 104. In any case, it may appear to the user or organization associated with the client system 108 that the resources of the distributed computing system 104 are resident on the client system 108 itself.

As discussed previously, the distributed computing system 104 performs DCM-based scheduling to schedule use of resources of the distributed computing system 104 by workload items 164 of one or more client systems 108. In this regard, DCM-based scheduling is distinct from, for instance, always charging 1 unit per CPU/hour or minute used by workload items 164. More specifically, DCM-based scheduling takes into account a number of dynamic factors to determine a "cost" associated with consuming system resources by one or more workload items 164. The determined costs may then be used by the distributed computing system 104 during scheduling of system resources (e.g., CPUs, memory, and the like) to the benefit of system operators or providers as well as users. For instance, usage of resources in lower demand may be afforded a lower consumption cost than other similar resources in higher demand. Accordingly, cost sensitive or non-time sensitive users may be able to take advantage of lower costs associated with the utilization of slower or more out of date resources of the distributed computing system while system providers may realize increased revenue from the usage of resources that may otherwise be experiencing low or negligible revenue. The dynamically-determined consumption costs disclosed herein can also assist in improving utilization of distributed computing system resources, the guaranteeing of SLAs, and the like.

As shown, node 116 may include a system manager 184 for use in determining which resources of distributed computing system 104 will address one or more particular workload items 164 of one or more projects 160 via use of the DCM-based scheduling techniques disclosed herein. The system manager 184 may include any number of modules, components and/or the like to aid in this pursuit, such as cost determinator 186, resource scheduler 188 and resource allocator 192. The cost determinator 186 is generally responsible for dynamically determining consumption costs for incoming workload items 164 in relation to requested resources (where the consumption costs are dynamically determined as a function of at least a demand for and availability of the requested resources), and the resource scheduler 188 is generally responsible for building a schedule of workload item execution that takes into account the dynamically determined consumption costs as well as existing SLAs, policies, constraints and/or the like. Furthermore, the resource allocator 192 is generally responsible for allocating system resources among the various incoming workload items 164 according to the DCM-determined schedule. For use by the resource scheduler 188 and/or resource allocator 192, the storage arrangement 132 may include a number of objects or data structures such as a list of workload items 194 using or requesting to use system resources (where at least some of workload items 194 may include workload items 164 of client system 108), any respective share entitlements 195 (e.g., expressed a percentage of all system resources) of the workload items 194, system resources 196 including corresponding metadata (e.g., type, location, demand, and the like), and DCM-determined schedules 197 of usage of the system resources.

As used herein, a "demand" for a system resource (e.g., for a category of system resources such as CPUs, for a specific type of system resources such as UltraSPARC IV CPUs, and/or the like) may be defined in one or more numerous manners. In one arrangement, demand for a resource (or type of resource) may be the total number of the type of resource currently handling workload items. In another arrangement, demand may be the total number of workload items 194 requesting to possibly use the particular type of resource. In a further arrangement, demand may be the total number of the type of resource covered under share entitlements guaranteed to users. For instance, if a company A pays to have 10% of a 10,000 CPU pool available at any time, then demand for that type of CPU would at least include the 1,000 CPUs covered by company A's share entitlement, even if workload items of company A are not utilizing all of the 1,000 CPUs. In some arrangements, demand may include various combinations of the aforementioned demand definitions.

As also used herein, an "availability" of a system resource may also be defined in one or more manners. In one arrangement, availability of a system resource may be the total quantity of the resource minus the demand for the resource. In another arrangement, availability of a system resource may be the number of similar resources available in the farm/cloud/system. Combinations of the above definitions are also envisioned to provide a definition of resource availability. As discussed previously, demand for and availability of a system resource are dynamic entities that change as system resources are allocated among workload items.

In addition to utilizing a demand for and an availability of a resource to dynamically obtain costs for consumption of one or more resources by workload items, the particular "cost structures" of the resources may also be taken into account. Cost structures may take numerous forms such as cost per unit time (e.g., $/hr or yr), an upfront flat fee plus a cost per unit time, and/or the like. Furthermore, different resources can be associated with different cost structures. For example, CPU resources may have a cost structure that is different from that of memory resources. Network and I/O bandwidth resources may also have their own cost structures. Additionally, the granularity of cost structures may be defined at finer levels. For instance, not all CPU resources may share one cost structure. CPUs from expensive, vertically scaling SMP (Symmetric Multi-Processor) systems may have a higher cost structure than that of more horizontally scaling 1 to 2-way systems. CPUs (cores/threads) of CMT (Chip Multi-Threading) based systems may have even lower cost structures. The various cost structures, while themselves introducing a dynamic nature for costs (e.g., by utilizing a different cost structure based on the specific type of CPU being utilized as opposed to merely using a single cost structure for all types of processing), are further modified by the demand and availability for each of them.

Before discussing how the resource scheduler 188 dynamically utilizes demand for and availability of various resources to determine consumption costs which may be used to build execution schedules, reference is initially made to the representative system resource table 200 in FIG. 2 (which may, for example, be stored in storage arrangement 132 of node 116). The system resource table 200 may include a plurality of data elements made up of rows representing the various types of system resources such as, for instance, processing category 204, memory category 208 and/or storage category 212. The data elements of the system resource table 200 may also include a number of metadata columns describing various characteristics of each of the categories such as type column 216, location column 220, cost structure column 224, quantity column 228, demand column 232 and/or availability column 236.

With reference to the processing category 204, the type column 216 indicates that the system includes two different types of CPUs; namely, 3.5 GHz processors located at nodes 1 and 2 (e.g., nodes 116, 117 in FIG. 1) and 2.5 GHz processors located at nodes 3 and 4 (e.g., nodes 118, 119 in FIG. 1). In this example, the 3.5 GHz processors are associated with a cost structure of $0.10/hr while the 2.5 GHz processors are associated with a cost structure of $0.05/hr (e.g., owing to the slower speed of the 2.5 GHz processors compared to the 3.5 GHz processors). Furthermore, the system includes a quantity of 2,000 3.5 GHz CPUs with a demand of 1,500 workload items and a resulting availability of 500 units, and a quantity of 4,000 2.5 GHz CPUs with a demand of 1,000 workload items and a resulting availability of 3,000 units. The reader should understand that more, fewer or different types of data elements, categories, columns and the like may be included in the system resource table 200, and that the system resource table 200 shown in FIG. 2 has only been provided to assist the reader in understanding the utilities disclosed herein.

Figure 4:
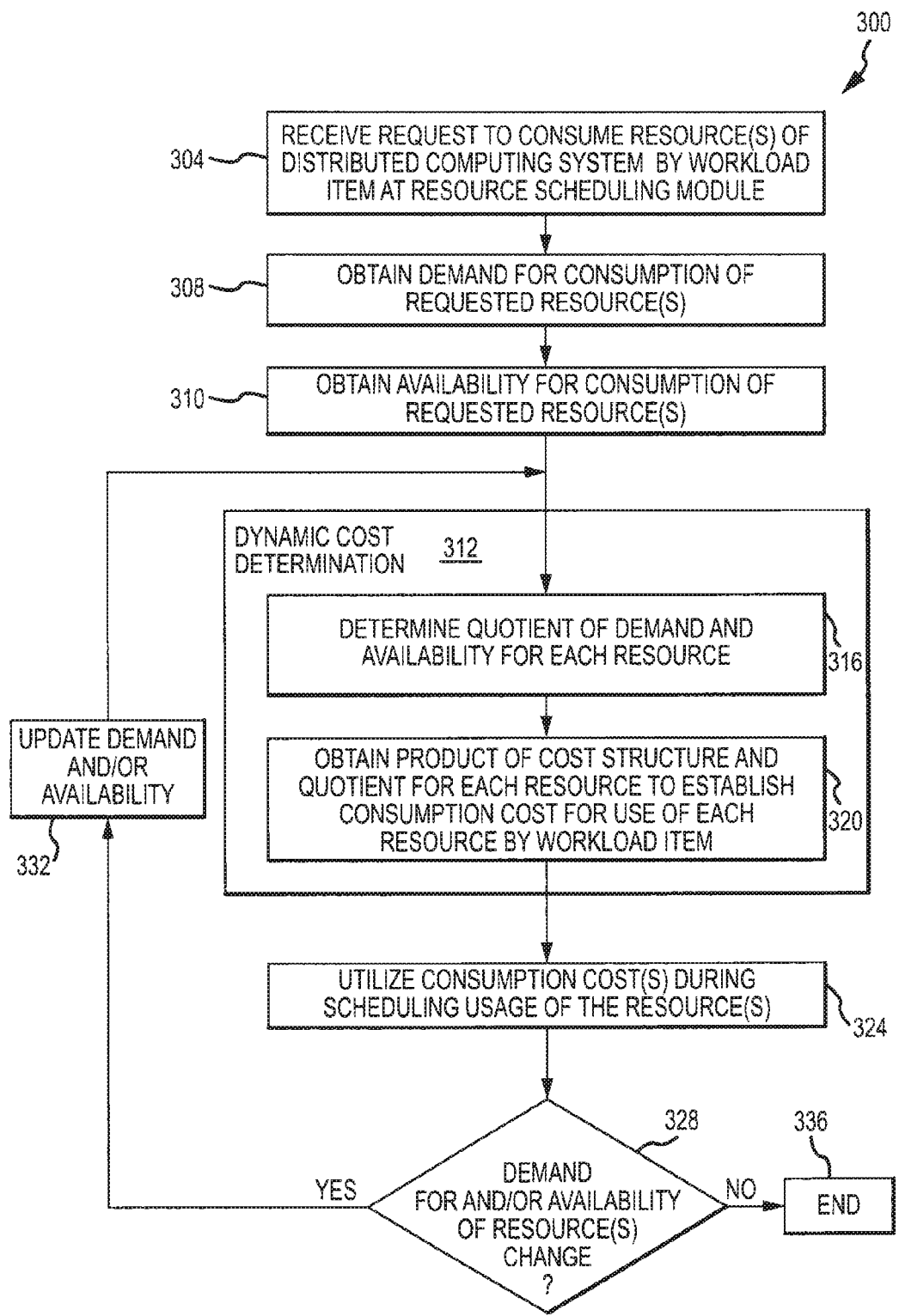
FIG. 4 is a flow diagram illustrating steps that may be performed by the system manager to dynamically determine a cost for consumption of distributed processing system resources by one or more workload items.

With reference to FIG. 4, a method 300 (e.g., protocol, set of computer-readable instructions) is illustrated that may be used to dynamically determine one or more consumption costs associated with the use of a system resource by one or more workload items of a client system 108 (as may be performed and/or represented by one or more of the various modules of the system manager 184). At 304, a request may be received at system manager 184 from browser 148 of client system 104 to consume a resource (e.g., processing capacity) of distributed computing system 104 by one or more workload items 164 of the client system 104 for a particular period of time (e.g., 24 hours). In this example, assume that the request does not specify any specific type of CPUs to be used to handle the workload items 164. Upon receiving the request, costs for consumption of one or more types of CPUs of the distributed computing system 104 may be determined by utilizing a DCM that incorporates a demand for and availability of each of the one or more types of CPUs. For instance, a cost for consuming a resource R1 by the incoming workload items may be defined as:

$$\text{Cost}(R1) = \text{CostStrucure}(R1) \times \frac{\text{Demand}(R1)}{\text{Availability}(R1)}$$

It can be seen that Cost(R1) may increase as each of CostStructure(R1) and Demand(R1) increases and/or as Availability(R1) decreases. Conversely, Cost(R1) may decrease with the decrease of either of CostStructure(R1) or Demand(R1) and/or the increase of Availability(R1). In this regard, the method may proceed to obtain 308 a demand for consumption of the requested resource (e.g., each of the one or more types of CPUs) and obtain 310 an availability for consumption of the requested resource (e.g., each of the one or more types of CPUs), and then proceed to a dynamic cost determination step at 312 using the obtained demand and availability. The dynamic cost determination 312 may include determining 316 a quotient of the demand for and availability of resource R1 (e.g., each of the one or more types of CPUs) and obtaining 320 a product of CostStructure(R1) and the determined quotient to establish a consumption cost for use of the resource R1 by the workload items. For example, and with reference to the processing category 204 of the farm resource table 200 of FIG. 2, a consumption cost for consuming 500 3.5 GHz CPUs for one hour may, using the above equation, be 500×($0.10/1 hour)×(1,500/500)=$150.00. In contrast, a consumption cost for consuming 500 2.5 GHz CPUs for an hour using the above equation may be 500×($0.05/1 hour)× (1,000/3,000)=$8.33.

The determined consumption costs can be utilized 324 during scheduling of system resources. In one arrangement, workload items 164 can be incorporated into a schedule that allocates use of the resource among all workload items 164 based at least partially on the consumption costs, and then use of the resource can be allocated among the workload items according to the schedule. For instance, the resource scheduler 188 may opt to schedule processing of workload items 164 on the 2.5 GHz CPUs rather than the 3.5 GHz CPUs due to the lower consumption cost. In one arrangement, the system manager 184 may perform the above consumption cost analysis among all of a particular type of CPU (e.g., among all 2.5 GHz CPUs), as each may have different demands and/or availabilities. In another arrangement, the system manager 184 may perform the above consumption cost analysis among various "pools" of resources (e.g., a CPU pool from node 117 and another CPU pool from node 120). Numerous other factors can be taken into account during the building of a schedule of execution such as specific client requests, SLAs, and the like. For instance, a user may specifically request for use of the 3.5 GHz CPUs rather than just any CPU.

Another use of the determined consumption costs may be to actually charge a user less for consumption resources having lower consumption costs (e.g., the 2.5 GHz CPUs in the above example) than other resources (e.g., the 3.5 GHz CPUs), either in currency or in share entitlement usage. In one arrangement, determined consumption costs may be sent to a first client over network(s) 112 for consideration by the client, and then workload items of the first client may not be built into a resource allocation schedule until the storage manager 184 has received a confirmation message from the client that approves allocation of the resource by the first workload item according to the consumption cost and/or schedule. Another way in which the determined consumption costs can be used in scheduling is by the system manager 184 attempting to ensure that a user opting to pay for consumption of a resource with a higher consumption cost (e.g., the 3.5 GHz CPUs in the above example) is actually allocated use of 3.5 GHz CPUs for all associated workload items rather than other types of CPUs (e.g., due to the elevated cost the user is willing to pay). Similar analyses can be performed for other CPUs and/or other resource categories (e.g., memory, storage, and the like).

The method 300 may make determinations 328 as to whether demands, availabilities, cost structures, and/or the like of system resources have changed, and may either update 332 such data elements in storage arrangement 132 (e.g., farm resources 196) accordingly for use in subsequent dynamic cost determination 312 or else end at 336. In one arrangement, each node 116-120 may individually maintain data structures (e.g., in respective storage arrangements 132) corresponding to current demands, availabilities and/or cost structures of respective resources, and pass such information to system manager 184 according to any appropriate schedule or upon request for use by the system manager 184 and/or storage in storage arrangement 132. In another arrangement, the system manager 184 may be responsible for collecting and centrally maintaining (e.g., in storage arrangement 132) demand, availability and/or cost structure information for all resources of the distributed computing system 104.

In any case, it can be appreciated how the cost to allocate to a particular use of a system resource by one or more workload items can dynamically adjust to changing demand for, availability of and/or cost structures of system resources to the benefit of both system operators and users. Such dynamically determined consumption costs can in some arrangements be sent or forwarded back to the client system 108 via browser 180 to, for instance, allow the user to make decisions in relation to use of resources of the distributed computing system 104. While the above discussion has generally been in the context of a single resource or type of resource, a similar process can be performed for each of the various categories of resources (e.g., memory, storage, and the like) and types thereof to obtain corresponding consumption costs for use in the scheduling of system resources.

As mentioned previously, dynamically-determined consumption costs for resource usage in the distributed computing system 104 as disclosed herein can also be used to facilitate the arbitration of resources that are in high demand. More specifically, when demand for a type of resource exceeds its capacity, some workload items must wait (i.e., be queued up) for later execution while other workload items utilize the resources. In such situations, consumption costs for each of the workload items can be dynamically determined as disclosed herein and then the dynamically determined consumption costs can be used during resource allocation arbitration using any appropriate arbitration scheme (e.g., a) first come-first serve, b) priority based on specific job attributes such as amount and type of resource required, job's owner/department/project, c) the amount of time the workload item has already waited for use of the resources, d) fair share allocation, and/or the like).

For instance, a fair share allocation arbitration scheme may use one or more multi-level, hierarchical fair share trees, where each node of a tree represents a user group which is given a share entitlement of one or more categories and/or types of resources of the distributed computing system 104 (e.g., group 1 is given a 30% share entitlement of resource type R1 while group 2 is given a 70% share entitlement of resource type R1). Shares may be distributed among child nodes of each node, further subdivided recursively among the child nodes at the next level down, and so on. Each node may have a normalized share entitlement percentage in the overall tree that may be obtained as a product of its share entitlement percentage within its parent, multiplied by its parent's share entitlement percentage, and so on until one reaches a root node. In some embodiments, share entitlements may be in relation to one or more combinations of resources of the distributed computing system 104. For instance, group 1 may be given a 25% share entitlement of all processing and memory capacity of the distributed computing system 104 in any combination (i.e., workload items of group 1 may utilize any number of CPUs and memory modules so long as the total number does not exceed 25% of the total quantity of CPUs and memory modules).

In the event that demand for a particular resource outweighs the total quantity or capacity of the resource, arbitration of the resource among the various user groups (and/or their respective workload items) is performed to determine which user group(s) may consume the resource before one or more other user groups. In one arrangement, a ratio of resource usage over shares entitlement (i.e., the "R/S" ratio) may be determined for each user group, and then the next workload item to be considered for consumption of the resource may be from a user group with the lowest R/S value. As can be appreciated, lower R/S values and thus higher resource priority may result from higher share entitlements and/or lower resource usage, and vice versa. Existing scheduling techniques that utilize static cost models fix the R value as a static cost based on the resources consumption. In contrast, the present disclosure introduces the dynamic nature of resource consumption costs due to demands for, availability of, cost structure, and/or the like of the resource(s) which can serve to improve utilization of system resources, improve the ability to guarantee SLAs, and/or the like.

For instance, the R/S value for a project "A" (e.g., project 160 in FIG. 1) of a user group having a number of workload items (e.g., workload items 164 in FIG. 1) requesting to a resource or type of resource may be defined as:

$$\frac{R}{S} \text{ for project } A = \frac{U(A)}{S(A)}$$

where U(A) is the usage cost of all workload items of project A consuming the resource or type of resource and S(A) is the shares entitlement of project A in relation to the resource or type or resource. Furthermore, the usage cost U(A) may be defined as:

$$U(A)=\text{SUM}(\text{Cost}(R,A))$$

As represented above, the usage cost U(A) of a resource or type of resource by project A may be the sum of the dynamically determined consumption costs for the various workload items of project A. By incorporating the previously discussed definition of dynamic consumption cost Cost(R) of one or more workload items into the above definition of usage cost U(A), and then substituting the usage cost U(A) into the above definition for R/S for project A, the following definition for R/S for project A may be acquired:

$$\frac{R}{S} \text{ for project } A = \frac{SUM\left[CostStructure(R1) \times \frac{\text{Demand}(R1)}{\text{Availability}(R1)}\right]}{S(A)}$$

Figure 5:
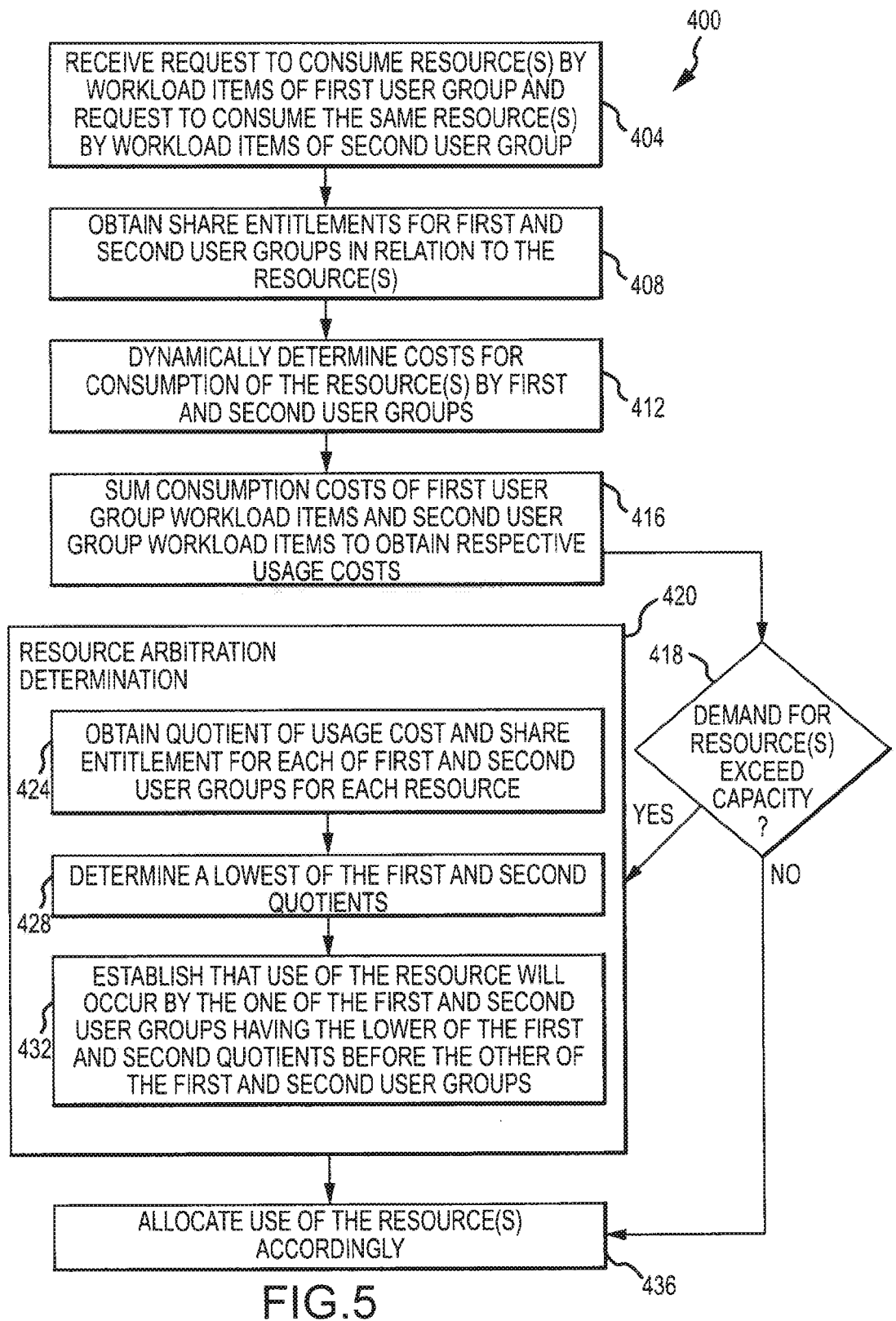
FIG. 5 is a flow diagram illustrating steps that may be performed by the system manager to allocate requested usages of distributed processing system resources between first and second user groups.

With the above definitions in mind and turning now to FIG. 5, a method 400 (e.g., protocol, set of computer-readable instructions) is illustrated that may be used to incorporate dynamically determined resource consumption costs into a resource allocation arbitration scheme (e.g., as may be performed and/or represented by one or more of the various modules of the system manager 184 using one or more of the above discussed definitions or equations). The method 400 may begin by receiving 404 at system manager 184 at least first and second requests from respective first and second user groups (e.g., via one or more client systems 108) to consume the same resource or type of resource R (e.g., UltraSPARC VII CPUs) by workload items of the first and second user groups. At 408, share entitlements for the first and second user groups (and/or respective projects including respective workload items) (e.g., S(first user group), S(second user group), and/or the like) may be obtained in relation to the requested resource or type of resource R (e.g., S(first user group)=30% of all processing capacity, regardless of type of CPU). Additionally, costs for consumption of the resource or type of resource R by workload items of the first and second user groups may be dynamically determined 412 (e.g., by determining Cost(R) for each workload item as discussed above), and then the workload items of the first and second user groups may be respectively summed 416 to obtain respective usage costs of the first and second user groups (e.g., U(first user group) and U(second user group)).

As an example, suppose that resource R in the above example is processing modules (regardless of CPU type) and that the distributed processing system 104 includes first, second and third types of CPUs (where each type may have different cost structures, demands and/or availabilities). Further, suppose that workload items of the first user group are currently consuming the first and second types of CPUs and those of the second user group are currently consuming the first and third types of CPUs. In this regard, step 412 of the method 400 may take into account, for each workload item, the cost structure, demand for and availability of the particular type of CPU (e.g., first, second or third type of CPU) that the workload item is currently consuming. Thereafter, such consumption costs may be summed to obtain respective usage costs of the first and second user groups (i.e., U(first user group) and U(second user group)). Such usage costs may be used by the system manager 184 during scheduling of resources of the distributed computing system 104.

With continued reference to FIG. 4, the method 400 may query 418 whether a current demand for the resource R has exceeded the ability of the resource R to satisfy incoming consumption requests from user groups, projects, workload items, and/or the like. In response to a negative answer to the inquiry 418, the method 400 may proceed to allocate 436 use of the resource R accordingly while taking into account the dynamically determined consumption costs as discussed previously. An affirmative answer to the inquiry 418 may cause the method 400 to proceed to a resource arbitration determination step 420 to decide whether workload items of the first user group or those of the second user group have priority to the resource R.

In one arrangement, the resource arbitration determination 420 may include determining R/S values for each of the first and second user groups and using such R/S values to arbitrate allocation of resource R between workload items of the first and second user groups. As can be seen in the above definition of R/S as well as FIG. 5, the method 400 may include obtaining 424 a quotient of the usage cost and share entitlement for each of the first and second user groups (i.e., obtaining U(first user group)/S(first user group) and obtaining U(second user group)/S(second user group)), determining 428 a lowest of the first and second quotients, and establishing 432 that use of the resource R will occur by workload items of the one of the first and second user groups having the lower of the first and second quotients before the other of the first and second user groups. Stated otherwise, the user group having the lower quotient will have priority over the other user group in relation to the resource R (where, in the above example, resource R is all types of CPUs). Use of the resource R may eventually be allocated 436 accordingly.

While the above example involves only two user groups, the same analysis may be equally applicable to more than two user groups (where R/S values may be determined for each user group and/or their respective projects, and then user groups/projects having lower R/S values may be granted priority to resources before those with higher R/S values). Furthermore, more fine-grained analyses can also be performed. In one arrangement, user groups and/or their projects may have respective share entitlement in relation to particular types of resources. That is, rather than having a share entitlements in relation to all types of processing (e.g., 30% of all processing capacity, regardless of specific CPU type), user groups may have specific share entitlements to particular types of CPUs (and/or particular types of memory, storage, and/or the like). For instance, a first user group may have a 10% share entitlement of CMT CPUs and a 15% share entitlement of UltraSPARC IV CPUs while a second user group may have a 25% share entitlement of CMT CPUs and a 5% share entitlement of UltraSPARC IV CPUs. In one regard, arbitrating allocation of CMT CPUs between workload items of the first and second user groups may entail utilizing the cost structure, demand, availability and share entitlements in relation to CMT CPUs to obtain R/S values as opposed to in relation to processing modules as a whole. In another regard, arbitrating allocation of processing as a whole (i.e., without regard to the specific type of CPU) between workload items of the first and second user groups may entail utilizing the cost structure, demand, availability and share entitlements in relation to each of CMT and UltraSPARC IV CPUs to obtain R/S values, and then summing the R/S values for CMT and UltraSPARC IV CPUs for each of the first and second user groups. Numerous other approaches consistent with the present disclosure are also envisioned and are thus encompassed herein.

In some situations, the cost of using or consuming a first resource or type of resource is taken into account during the allocation of use of a second resource or type of resource. For instance, in the above example in which the distributed computing system 104 includes first, second and third types of CPUs and in which each of the first and second user groups includes a share entitlement in relation to processing as a whole (rather than in relation to the specific type of CPU), determining whether to allocate use of the second type of CPU to the first user group would take into account any consumption costs of the first and third types of CPUs by the first user group (because consumption of the first and third types of CPUs counts against the first user group's share entitlement in relation to processing as a whole).

In other situations, the cost of using or consuming a first resource or type of resource may not be taken into account during the allocation of use of a second resource or type of resource if, for instance, the cost structure associated with the first resource or type of resource is at least partially "disjoint" (e.g., distinct) from the cost structure associated with the second resource or type of resource. For instance, and with reference to the distributed computing environment of FIG. 1, the resources of nodes 116, 118 may be managed by a vendor different from that of nodes 117, 119. In this regard, consumption of a particular type of resource on node 118 by workload items of a user group may have no bearing on determining whether and/or how to allocate use of the same type of resource on node 119 (e.g., assuming the user group has separate share entitlements for the resource in relation to the different vendors, and without regard to whether or not a static cost of using the resource (e.g., dollars/hour) is the same for both of the vendors). As another example, use of a first set of resources may have no or little bearing on the allocation of a second set of resources when the first set merely caters to a small subset of the workload demand and/or the demand for the two resources sets is from different jobs.

Turning to FIG. 3, another embodiment of a farm resource table 500 is provided for use by system manager 184 that illustrates the use of disjoint cost structures C1 and C2. The farm resource table 500 may include a plurality of data elements made up of rows representing the various names of system cost structures such as, for instance, disjoint cost structure C1 504 and disjoint cost structure C2 508. The data elements of the farm resource table 500 may also include a number of metadata columns describing various characteristics of each of the cost structures such as category column 512, type column 516, location column 520 and/or cost structure column 524. In the interest of clarity, only processing resources (as identified in category column 512) have been illustrated (with the understanding that each cost structure may also include memory resources, storage resources and/or the like).

Each of the resources in farm resource table 500 may be identified by or associated with a disjoint cost structure. As shown, 3.5 GHz CPUs at node 1 (e.g., node 116 in FIG. 1) and 2.5 GHz CPUs at node 3 (e.g., node 118 in FIG. 1) may each be associated with disjoint cost structure C1, and 3.5 GHz CPUs at node 2 (e.g., node 117 in FIG. 1) and 2.5 GHz CPUs at node 4 (e.g., node 119 in FIG. 1) may each be associated with disjoint cost structure C2. For instance, disjoint cost structure C1 may be associated with resources from a first vendor and disjoint cost structure C2 may be associated with resources from a second vendor. In one arrangement, any resource allocation analysis conducted in relation to resources from one of disjoint cost structures C1 and C2 may not take into account any usage or associated costs in relation to resources from the other of disjoint cost structures C1 and C2. While the same types of resources have been shown as having different cost structure values within disjoint cost structures C1 and C2 (e.g., note how 3.5 GHz CPUs under disjoint cost structure C1 have a cost structure of $1000.00/year+$0.20/hour whereas those under disjoint cost structure C2 have a cost structure of $500.00/year+$0.30/hour), it is also envisioned that the same types of resources may in other arrangements have the same cost structure values across disjoint cost structures.

With the introduction of disjoint cost structures into the scheduling analysis performed by the system manager 184, resource usage may now be defined specific to each disjoint cost structure. For instance, suppose that resources associated with a disjoint cost structure C1 are being considered for allocation among workload items of a project A. Here, the current usage of workload items of project A may be defined as:

$$U(A,C1) = \text{SUM}[\text{Cost}(R(x,C1))]$$

where Cost(R(x, C1)) is the cost for each workload item of project A consuming resources of cost structure C1 and R(x, C1) represents a resource R(x) associated with cost structure C1. Using a previously discussed definition of Cost for reference, Cost(R(x, C1)) for each workload item may thus be defined as:

$$\text{Cost}(R(x, C1)) = \text{CostStructureC1} \times \frac{\text{Demand}(R(x, C1))}{\text{Availability}(R(x, C1))}$$

In the event that demand for a particular resource or type of resource within a disjoint cost structure exceeds ability of the resource or type of resource to satisfy incoming requests, the resource(s) may be appropriately arbitrated between the various user groups, projects and or the like. For instance, a fair share arbitration system may entail determining an R/S value for each user group, project and/or the like, which may generally be defined as:

$$\frac{R}{S} \text{ for group or project} = \frac{U(A, C)}{S(A, C)}$$

As discussed previously, a user group or project having an R/S value lower than another user group or project may be afforded greater priority to a requested resource or type of resource than the other user group or project.

It will be readily appreciated that many deviations may be made from the specific embodiments disclosed in the specification without departing from the spirit and scope of the invention. In one arrangement, the utilities disclosed herein may be in relation to one or more past or future time periods. For instance, in the event that a consumption request in relation to a resource received at system manager 184 is in relation to a particular (future) time period, then the dynamic cost determination analysis (e.g., the demand for and availability of the resource) may also be in relation to the future time period. Also, it should be understood that the functionalities performed by many of the processes and modules discussed herein may be performed by other modules, devices, processes, etc. The illustrations and discussion herein has only been provided to assist the reader in understanding the various aspects of the present disclosure. Furthermore, one or more various combinations of the above discussed arrangements and embodiments are also envisioned (e.g., the system manager 184 may concurrently utilize the system resource table 200 of FIG. 2 for some resources and the system resource table 500 of FIG. 3 for other resources).

Embodiments disclosed herein can be implemented as one or more computer program products, i.e., one or more modules of computer program instructions encoded on a computer-readable medium for execution by, or to control the operation of, data processing apparatus. For example, the various components of the system manager 184 (e.g., cost determinator 186, resource scheduler 188 and resource allocator 192) may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The distributed processing environment 100 may encompasses one or more apparatuses, devices, and machines for processing data, including by way of example a programmable processor, a computer, or multiple processors or computers. In addition to hardware, the distributed processing environment 100 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (e.g., the dynamic consumption cost determination and associated resource scheduling disclosed herein) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors (e.g., processing arrangements 128 and 152 in FIG. 1) for performing instructions and one or more memory devices (e.g., memory arrangements 124, 148 in FIG. 1) for storing instructions and data. The techniques described herein may be implemented by a computer system configured to provide the functionality described.

In different embodiments, distributed computing environment (i.e., the one or more client systems 108, nodes 116-120, and/or the like) may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks (e.g., storage arrangements 132, 156 in FIG. 1). However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer (e.g., client system 108 in FIG. 1) having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A method, comprising:
  receiving, at a resource scheduling module of a distributed processing system, at least one request to consume a first resource of the distributed processing system by at least a first workload item of a first project, wherein a plurality of the first resource are distributed throughout the distributed processing system, and wherein the first project comprises a first share entitlement of the first resource that describes a quantity of use of the plurality of the first resource by the first project;
  obtaining a demand for consumption of the plurality of the first resource by workload items;
  obtaining an availability for consumption of the plurality of the first resource by workload items;
  establishing a cost for consuming the plurality of the first resource by the first workload item of the first project by obtaining, using a processor, a product of a) a cost structure of the first resource and b) a quotient of the demand for and availability of the plurality of the first resource;
  obtaining, using the processor, a quotient of a) the established cost for consuming the plurality of the first resource by the first workload item of the first project and b) the first share entitlement of the first project;
  incorporating the first workload item into a schedule that allocates use of the plurality of the first resource among workload items based at least partially on the established cost for consuming the plurality of the first resource by the first workload item of the first project and the obtained quotient; and
  allocating use of the plurality of the first resource among the workload items according to the schedule.

2. The method of claim 1, wherein a consumption cost for a first of the plurality of the first resource is less than a consumption cost for a second of the plurality of the first resource, and wherein the incorporating comprises:
  allocating use of the first of the plurality of the first resource by the first workload item.

3. The method of claim 1, further comprising:
  obtaining at least one of an updated demand and an updated availability in relation to at least one of the plurality of the first resource;
  establishing an updated cost for consuming the one of the plurality of the first resource by obtaining, using the processor, a product of a) its first cost structure and b) a quotient of the updated demand for and/or updated availability; and
  updating the schedule by at least partially utilizing the updated consumption cost.

4. The method of claim 1, wherein the consumption request is received from a first client over at least one network, and wherein the method further comprises:
  sending the consumption cost to the first client over the at least one network; and receiving a message from the first client that approves allocation of the resource by the first workload item according to the schedule.

5. The method of claim 1, wherein the consumption request is in relation to consuming the resource during a first time period, and wherein the demand and availability are in relation to the first time period.

6. The method of claim 1, further comprising:
  receiving, at the resource scheduling module of the distributed processing system, a request to consume the first resource by at least a first workload item of a second project;
  establishing costs for consuming each of the plurality of the first resource by the first workload item of the second project by obtaining, using a processor, a product of a) its cost structure and b) a quotient of the demand for and availability of the resource;

obtaining, using the processor, a quotient of a) the established costs for consuming the plurality of the first resource by the first workload item of the second project and b) a second share entitlement of the second project;

determining a lowest of the obtained quotient for the first project and second project; and assigning priority for consumption of the plurality of the first resource to the first workload item of the first or second project determined to have the lowest obtained quotient.

7. The method of claim 1, further comprising:

receiving, at the resource scheduling module, at least one request to consume a second resource of the distributed processing system by the first workload item of the first project, wherein a plurality of the second resource are distributed throughout the distributed processing system;

obtaining a demand for consumption of the plurality of the second resource by workload items;

obtaining an availability for consumption of the plurality of the second resource by workload items; and establishing a cost for consuming the plurality of the second resource by the first workload item of the project by obtaining, using the processor, a product of a) a cost structure of the second resource and b) a quotient of the demand for and availability of the plurality of the second resource, wherein a cost for consuming resources of the compute farm by the first project comprises at least the costs for consuming the first and second resources.

8. The method of claim 7, wherein cost structures of the plurality of the first resource are different than cost structures of the plurality of the second resource.

9. The method of claim 1, wherein the first resource comprises at least one of memory modules, processing modules, storage devices, network modules, software, and input/output modules.

10. A non-transitory computer readable medium that stores instructions executable by one or more processors to perform a method that comprises:

receiving, at a resource scheduling module of at least a first computing grid, requests to consume a first type of resource of the first computing grid by a plurality of workload items of a first user group and by a plurality of workload items of a second user group of the plurality of user groups;

obtaining, at the resource scheduling module, share entitlements of the first type of resource describing a quantity of use of the first type of resource by the first and second user groups, respectively;

dynamically determining costs for consumption of the first type of resource by each of the workload items of the first and second user groups;

summing the consumption costs of the workload items of the first user group and the consumption costs of the workload items of the second user group to respectively obtain usage costs for the first and second user groups; and allocating use of the first type of resource between the first and second user groups based on the obtained usage costs and share entitlements, wherein the allocating comprises:

obtaining a first quotient of the usage cost and share entitlement of the first user group;

obtaining a second quotient of the usage cost and share entitlement of the second user group;

determining a lower of the first and second quotient; and allocating use of the first type of resource to the one of the first or second user group associated with the lower of the first and second quotient before allocating use to the other of the first or second user group.

11. The computer readable medium of claim 10, wherein the dynamically determined costs utilize at least one of a) a demand for the first type of resource by workload items and b) an availability for consumption of the first type of resource by workload items.

12. The computer readable medium of claim 10, wherein the method further comprises:

receiving, at the resource scheduling module, requests to consume a second type of resource of the first computing grid by a plurality of workload items of the first and second user groups; obtaining, at the resource scheduling module, share entitlements of a second type of resource of the first computing grid for the first and second user groups, respectively;

dynamically determining costs for consumption of the second type of resource by each of the workload items of the first and second user groups;

summing the costs for consumption of the second type of resource of the workload items of the first user group and the costs for consumption of the second type of resource of the workload items of the second user group to respectively obtain usage costs of the second type of resource for the first and second user groups; and allocating use of the second type of resource between the first and second user groups based on the obtained usage costs and share entitlements.

13. The computer readable medium of claim 12, wherein determination of allocation of use of the second type of resource between the first and second user groups is free from utilization of the usage costs in relation to the first type of resources for the first and second user groups.

14. The computer readable medium of claim 10, wherein the share entitlements of the first and second user groups for the first type of resource are hierarchically related to share entitlements of other user groups for the first type of resource.

15. The computer readable medium of claim 10, wherein the method further comprises:

providing, to the first and/or second user group, access to the first type of resource of the first computing grid according to the determined allocation.

16. A computing system for use in scheduling usage of a plurality of resources of a computing cloud by a plurality of workload items, comprising:

a processing module; and a memory module logically connected to the processing module and comprising a set of computer readable instructions executable by the processing module to:

receive a request to consume a first type of resource of the computing cloud by at least a first workload item of a first project, wherein the first project comprises a first share entitlement of the first type of resource that describes a quantity of use of the first type of resource by the first project;

obtain from the computing cloud a demand for consumption of the first type of resource by workload items;

obtain from the computing cloud an availability for consumption of the first type of resource by workload items;

determine a product of a) a first cost structure of the first type of resource and b) a quotient of the demand for and availability of the first type of resource to establish a cost for consuming the first type of resource by the first workload item;

obtain a quotient of a) the consumption cost for the first type of resource by the first workload item and b) the first share entitlement of the first project; and incorporate the first workload item into a schedule that allocates use of the first type of resource among workload items based at least partially on the consumption cost and the obtained quotient.

17. The method of claim 1, further comprising:

utilizing the obtained quotient to determine a priority for consumption of the first resource by the first workload item relative to at least one other workload item.

18. The computing system of claim 16, wherein the set of computer readable instructions are further executable by the processing module to:

utilize the obtained quotient to determine a priority for consumption of the first type of resource by the first workload item relative to at least one other workload item responsive to the demand for consumption of the first type of resource by workload items exceeding a capacity of the first type of resource by workload items.

* * * * *

UNITED STATES PATENT AND TRADEMARK OFFICE
CERTIFICATE OF CORRECTION

PATENT NO. : 8,583,799 B2  
APPLICATION NO. : 13/103748  
DATED : November 12, 2013  
INVENTOR(S) : Podila Page 1 of 1

It is certified that error appears in the above-identified patent and that said Letters Patent is hereby corrected as shown below:

In the Specification

In column 19, line 34, delete "and or" and insert -- and/or --, therefor.

Signed and Sealed this  
Third Day of June, 2014

Michelle K. Lee  
*Deputy Director of the United States Patent and Trademark Office*